United States Patent
Lee et al.

(10) Patent No.: US 7,933,336 B2
(45) Date of Patent: Apr. 26, 2011

(54) IMAGE DOWN-SAMPLING TRANSCODING METHOD AND DEVICE

(75) Inventors: Yung-Lyul Lee, Seoul (KR); Euee-S. Jang, Seoul (KR); Chung-Ku Lee, Inchon (KR)

(73) Assignee: Humax Co., Ltd., Gyeoniggi-do (KR)

( * ) Notice: Subject to any disclaimer, the term of this patent is extended or adjusted under 35 U.S.C. 154(b) by 1547 days.

(21) Appl. No.: 11/289,649

(22) Filed: Nov. 30, 2005

(65) Prior Publication Data

US 2006/0133500 A1 Jun. 22, 2006

(30) Foreign Application Priority Data

Nov. 30, 2004 (KR) .................. 10-2004-0099400
Nov. 9, 2005 (KR) .................. 10-2005-0107224

(51) Int. Cl.
*H04N 11/02* (2006.01)
*H04N 11/04* (2006.01)

(52) U.S. Cl. .......................... 375/240.16; 375/240.12

(58) Field of Classification Search ............. 375/240.16, 375/240.24, 240.21, 240.12, 240.22, 240.18, 375/240.17; 382/236, 238, 253
See application file for complete search history.

(56) References Cited

U.S. PATENT DOCUMENTS

2005/0063466 A1* 3/2005 Etoh et al. ............... 375/240.16
2005/0135486 A1 6/2005 Lee

FOREIGN PATENT DOCUMENTS

KR 20050062836 A 6/2005

OTHER PUBLICATIONS

Korean Intellectual Property Office, Preliminary Rejection Letter in Korean priority application (mailed Nov. 17, 2006).

* cited by examiner

*Primary Examiner* — Dov Popovici

(74) *Attorney, Agent, or Firm* — Baker Botts L.L.P.

(57) ABSTRACT

Methods and devices are provided for down-sampling an image from H.264 to MPEG-4 at a high speed. The method for converting a first macro block having a first format into a second macro block having a second format includes: (a) determining a block mode of the second macro block and converting the first macro block into the second macro block with the determined block mode, when the number of intra macro blocks included in the first macro block satisfies a first condition; (b) determining a block mode of the second macro block and converting the first macro block into the second macro block with the determined block mode, when the number for inter macro blocks included in the first macro block satisfies a second condition; and (c) re-adjusting a motion vector of the second macro block, after the conversion of the first macro block into the second macro block is finished.

32 Claims, 15 Drawing Sheets

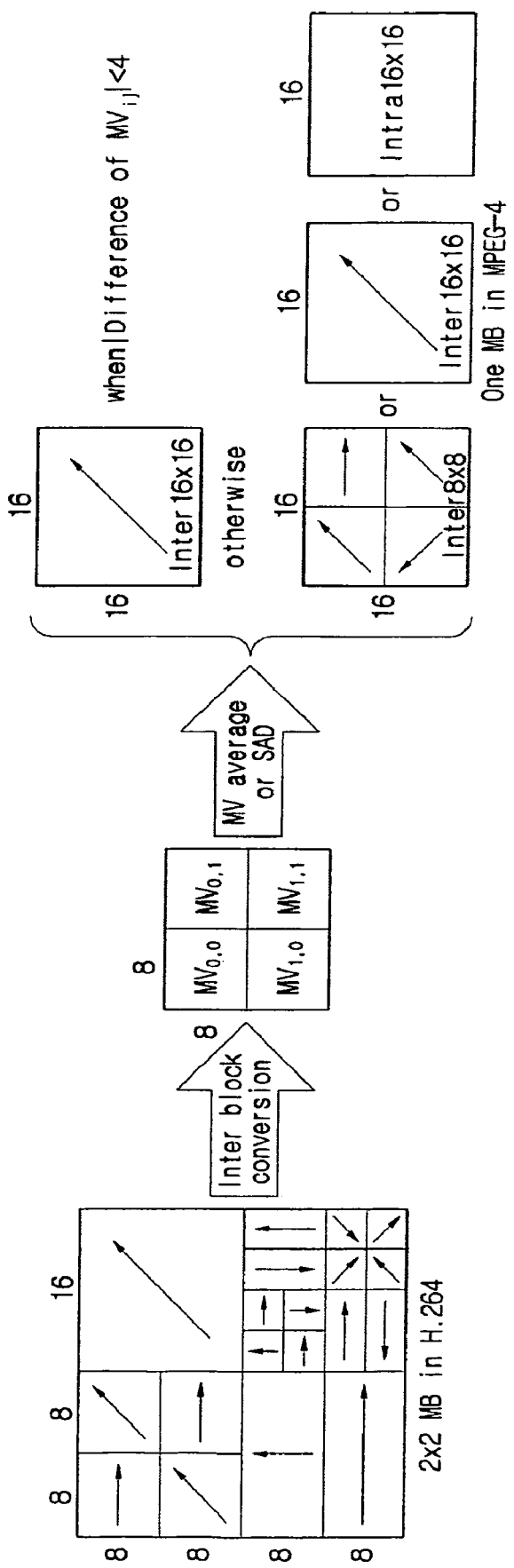

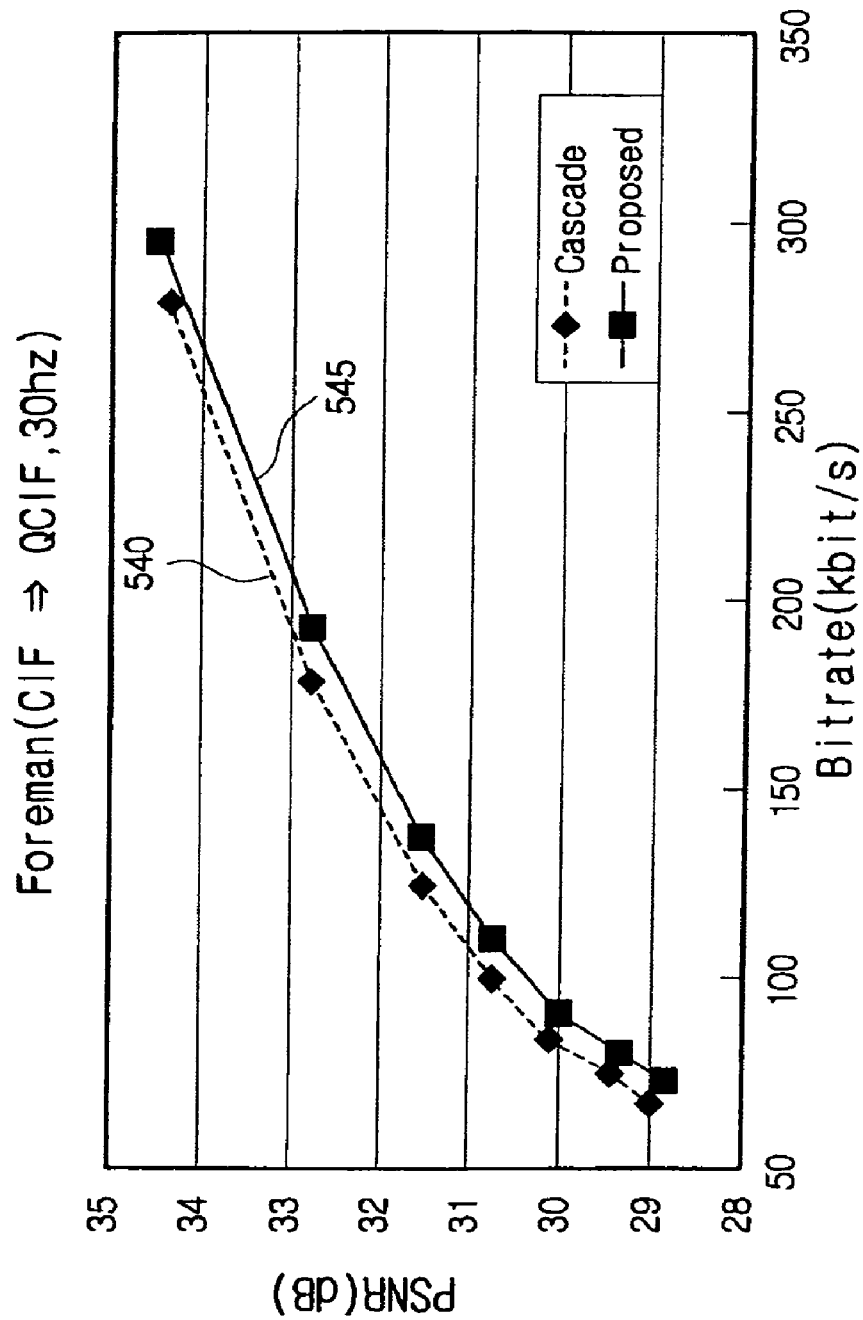

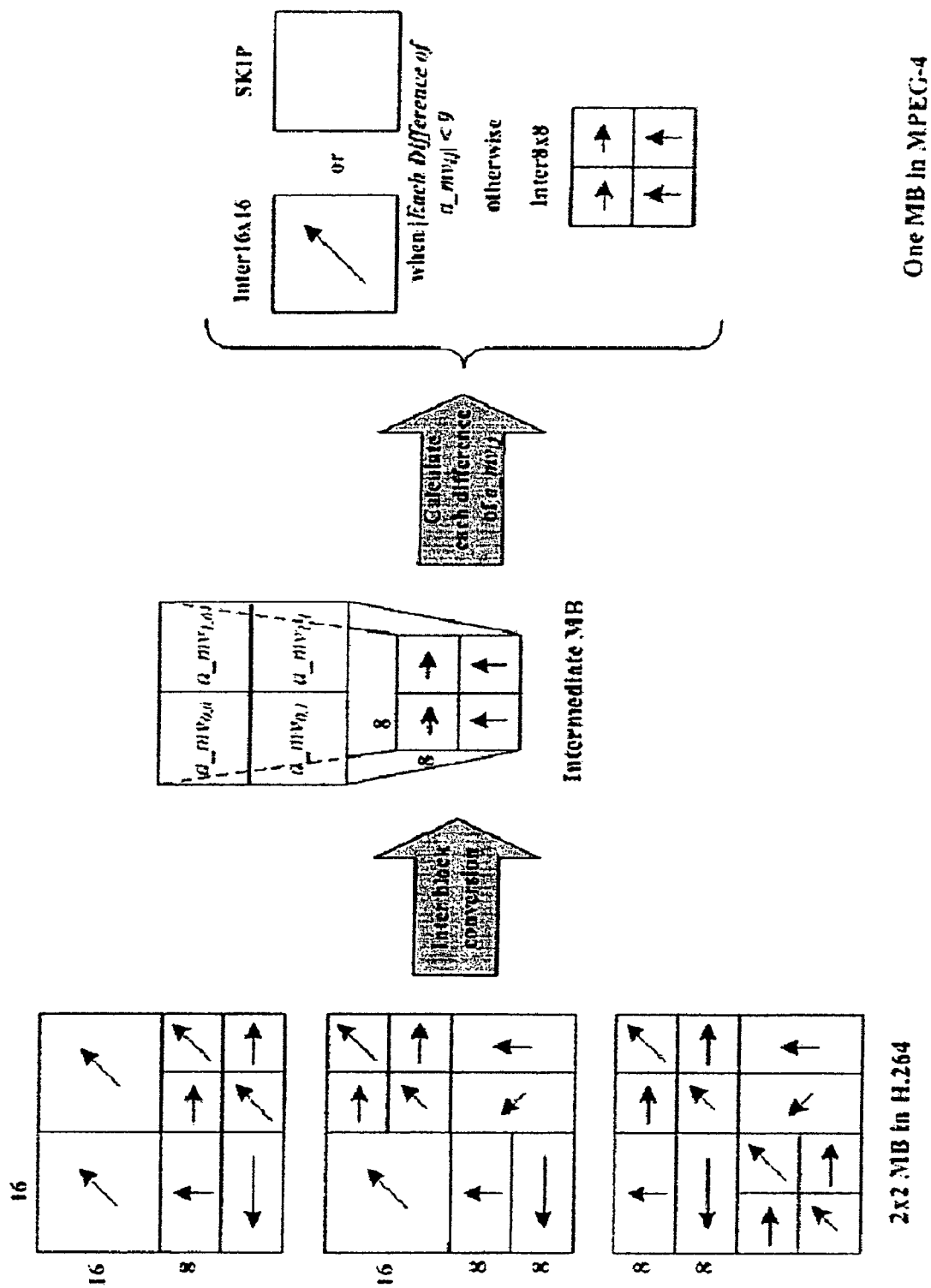

IMAGE DOWN-SAMPLING TRANSCODING METHOD AND DEVICE

BACKGROUND OF THE INVENTION

1. Field of the Invention

The present invention relates to an image down-sampling coding method and device, more particularly to a method and device for performing an image down-sampling process from H.264 to MPEG-4 at a high speed.

2. Description of Related Art

Thanks to the development of computers and networks, a variety of data can be transmitted from a transmission party to a reception party. There have been multimedia standard compression formats developed for transmitting large-capacity multimedia data through networks. Various video transcoding methods of performing conversion processes suitable for circumferences of the transmission party and the reception party by considering QoS (Quality of Service) of both parties have been introduced. Such video coding methods are roughly divided into a transcoding method in a pixel domain and a transcoding method in a DCT (Discrete Cosine Transform) domain.

The best transcoding method in view of image quality is a cascaded pixel-domain transcoding method of decoding input bit streams of images and encoding the decoded images again. However, since the encoding process is performed once more, such a conventional method has a problem with the increase in complexity. Therefore, an efficient transcoding method which can improve the complexity while maintaining the image quality is required.

SUMMARY OF THE INVENTION

The present invention is contrived to solve the above-mentioned problems. An objective of the present invention is to provide an image down-sampling transcoding method and device which can reduce complexity while maintaining the image quality by re-using information on macro blocks. That is, the present invention provides a transcoding method which re-uses information on macro blocks used in an H.264 decoder so as to reduce the complexity.

Another objective of the invention is to provide a transcoding method and device for smooth communication by reducing an image bit stream having a CIF (Common Intermediate Format) size, which is encoded by an H.264 (ITU-T Recommendation H.264 and ISO/IEC MPEG-4 Part 10 Advanced Video Coding) BP (Baseline Profile) encoder, into a half in image size in a pixel domain and converting the image bit stream into an MPEG-4 SP (Simple Profile) image bit stream having a QCIF (Quarter Common Intermediate Format) size. Other objectives of the invention will become apparent through preferred embodiments to be described later.

According to a first aspect of the present invention, there is provided a method of performing an image down-sampling process from H.264 to MPEG-4 at a high speed.

According to a preferred embodiment of the invention, there is provided an image down-sampling transcoding method for converting a first macro block having a first format into a second macro block having a second format, the image down-sampling transcoding method comprising the steps of: (a) determining a block mode of the second macro block having a C×D size (where C and D are natural numbers) and converting the first macro block into the second macro block with the determined block mode, when the number of intra macro blocks included in the first macro block having a A×B size (where A and B are natural numbers) satisfies a first condition; (b) determining a block mode of the second macro block and converting the first macro block into the second macro block with the determined block mode, when the number of inter macro blocks included in the first macro block satisfies a second condition; and (c) re-adjusting a motion vector of the second macro block, after the conversion of the first macro block into the second macro block is finished.

The first macro block may be converted into the second macro block with the determined block mode while being down-sampled using an average filter.

In the image down-sampling transcoding method, step (a) may include converting the first macro block into one intra macro block, when the first macro block includes only the intra macro blocks.

Here, step (a) may include determining the block mode using an SAD comparison method for macro blocks, when the first macro block includes some intra macro blocks.

In the image down-sampling transcoding method, step (b) may include: converting the first macro block into the second macro block with the inter mode when the number of inter macro blocks is greater than or equal to a predetermined number or when a difference value between the motion vectors is calculated and the difference value is less than or equal to a predetermined value; and determining the block mode using an SAD comparison method of macro blocks and converting the first block into the second block with the determined block mode in the other cases.

The SAD comparison method may include the steps of: calculating SADs between two inter macro blocks and determining the least inter SAD; and converting the first macro block into the second macro block with the block mode corresponding to the least SAD by comparing the least inter SAD with the predetermined intra SAD.

A mean pixel value of a macro block may be calculated by the following equation:

$$MB_{mean} = \sum_{i=0}^{15}\sum_{j=0}^{15} org_{i,j}$$

where $org_{i,j}$ denotes pixel values of 16×16 pixels in a macro block, and $MB_{mean}$ denotes the mean pixel value of a macro block. Here, the intra SAD may be calculated by the following equation.

$$SAD_{INTRA} = \sum_{i=0}^{15}\sum_{j=0}^{15} |org_{i,j} - MB_{mean}|$$

The re-adjustment of the motion vector may be performed using the following equation:

$$MV_{i,j} = \left( \frac{\sum_{k=0}^{3}\sum_{l=0}^{3} mv_{m,n,k,l}}{\sum_{k=0}^{3}\sum_{l=0}^{3} l} \right) >> 2, \quad i,j = 0,1$$

where m and n denote coordinate values in the axis of abscissa and the axis of ordinate in an 8×8 mode block which is an intermediate macro block, and k and l denote coordinate values in the axis of abscissa and the axis of ordinate in a 4×4 mode block corresponding to the (m,n)-th macro block in 2×2 macro blocks.

In the image down-sampling transcoding method, (c) may include the steps of: searching for an integer pixel motion vector in ±3 neighboring pixels about an integer pixel motion vector; and searching for a half pixel motion vector in ±1 neighboring pixels about the searched integer pixel motion vector.

According to another preferred embodiment of the invention, there is provided an image down-sampling transcoding method for converting a first macro block having a first format into a second macro block having a second format, the image down-sampling transcoding method comprising the steps of: determining any one of the candidate block modes having the second format, which is determined in accordance with a predetermined condition by types of macro blocks included in the first macro block having a predetermined size, as a block mode of the second macro block and converting the first macro block into the second macro block with the determined block mode; and re-adjusting a motion vector of the second macro block, after the conversion of the first macro block into the second macro block is finished.

In the image down-sampling transcoding method, the predetermined condition may be such that one intra macro block having the second format is determined as the block mode when three or more intra macro blocks are included in the first macro block.

Furthermore, the predetermined condition may be such that any one of the candidate block modes is determined as the block mode using a SAD comparison method of macro blocks included in the first macro block, when two or less intra macro blocks are included in the first macro block. Here, the candidate block modes may include one or more of a skip mode, an inter 16×16 mode, and an inter 8×8 mode.

Alternatively, The predetermined condition may be such that any one of the candidate block modes is determined as the block mode using a SAD comparison method of macro blocks, when only inter macro blocks are included in the first macro block and two or less macro blocks in the inter 16×16 mode are included in the inter macro blocks. Here, the candidate block modes may include one or more of a skip mode, an inter 16×16 mode, and an inter 8×8 mode.

When a difference between the motion vectors in the respective macro blocks is calculated and the difference is less than or equal to a predetermined threshold value, any one of the inter 16×16 mode and the skip mode may be determined as the block mode and in the other cases, the inter 8×8 mode may be determined as the block mode.

Here, any one of the candidate block modes may be a block mode having the least SAD value.

A mean pixel value of a macro block may be calculated by the following equation:

$$MB_{mean} = \sum_{i=0}^{15}\sum_{j=0}^{15} org_{i,j}$$

where $org_{ij}$ denotes pixel values of 16×16 pixels in a macro block and $MB_{mean}$ denotes the mean pixel value of a macro block. The intra SAD may be calculated by the following equation:

$$SAD_{INTRA} = \sum_{i=0}^{15}\sum_{j=0}^{15} |org_{i,j} - MB_{mean}|$$

The re-adjustment of the motion vector may be performed using the following equation:

$$MV_{i,j} = \left( \frac{\sum_{k=0}^{3}\sum_{l=0}^{3} mv_{m,n,k,l}}{\sum_{k=0}^{3}\sum_{l=0}^{3} l} \right) >> 2, \quad i, j = 0, 1$$

where m and n denote coordinate values in the axis of the abscissa and the axis of ordinate in an 8×8 mode block which is an intermediate macro block and k and l denote coordinate values in the axis of the abscissa and the axis of ordinate in a 4×4 mode block corresponding to the (m,n)-th macro block in 2×2 macro blocks.

According to another aspect of the invention, there is provided a device for down-sampling an image from H.264 to MPEG-4 at a high speed.

That is, according to a preferred embodiment of the invention, there is provided an image down-sampling transcoding device for converting a first macro block having a first format into a second macro block having a second format, the image down-sampling transcoding device comprising: a first conversion unit determining a block mode of the second macro block and converting the first macro block into the second macro block with the determined block mode, when the number of intra macro blocks included in the first macro block satisfies a first condition; a second conversion unit determining a block mode of the second macro block and converting the first macro block into the second macro block with the determined block mode, when the number for inter macro blocks included in the first macro block satisfies a second condition; and a motion vector re-adjusting unit re-adjusting a motion vector of the second macro block, after the conversion of the first macro block into the second macro block is finished.

The first conversion unit may convert the first macro block into one intra macro block, when the first macro block includes only the intra macro blocks and may determine the block mode using an SAD comparison method for macro blocks, when the first macro block includes some intra macro blocks.

The second conversion unit may convert the first macro block into the second macro block with the inter mode, when the number of inter macro blocks is greater than or equal to a predetermined number or when a difference value between the motion vectors is calculated and the difference value is less than or equal to a predetermined value and may determine the block mode using an SAD comparison method of macro blocks and converts the first block into the second block with the determined block mode in the other cases.

The SAD comparison method is characterized by: calculating SADs between two inter macro blocks and determining the least inter SAD; and converting the first macro block into the second macro block with the block mode corresponding to the least SAD by comparing the least inter SAD with the predetermined intra SAD.

According to another preferred embodiment of the invention, there is provided an image down-sampling transcoding device for converting a first macro block having a first format into a second macro block having a second format, the image down-sampling transcoding device comprising: a conversion unit determining any one of candidate block modes having the second format, which is determined in accordance with a predetermined condition by types of macro blocks included in the first macro block having a predetermined size, as a block mode of the second macro block and converting the first macro block into the second macro block with the determined block mode; and a motion vector re-adjusting unit re-adjusting a motion vector of the second macro block, after the conversion of the first macro block into the second macro block is finished.

The predetermined condition may be such that one intra macro block having the second format is determined as the block mode when three or more intra macro blocks are included in the first macro block.

The predetermined condition may be such that any one of the candidate block modes is determined as the block mode using a SAD comparison method of macro blocks included in the first macro block, when two or less intra macro blocks are included in the first macro block. Here, the candidate block modes may include one or more of a skip mode, an inter 16×16 mode, and an inter 8×8 mode.

Alternatively, the predetermined condition may be such that any one of the candidate block modes is determined as the block mode using a SAD comparison method of macro blocks, when only inter macro blocks are included in the first macro block and two or less macro blocks in the inter 16×16 mode are included in the inter macro blocks. Here, the candidate block modes may include one or more of a skip mode, an inter 16×16 mode, and an inter 8×8 mode.

The conversion unit may calculate a difference between the motion vectors in the respective macro blocks, may determine any one of the inter 16×16 mode and the skip mode as the block mode when the difference is less than or equal to a predetermined threshold value, and in the other cases, may determine the inter 8×8 mode as the block mode.

A mean pixel value of a macro block may be calculated by the following equation:

$$MB_{mean} = \sum_{i=0}^{15} \sum_{j=0}^{15} org_{i,j}$$

where $org_{i,j}$ denotes pixel values of 16×16 pixels in a macro block and $MB_{mean}$ denotes the mean pixel value of a macro block. Here, the intra SAD may be calculated by the following equation:

$$SAD_{INTRA} = \sum_{i=0}^{15} \sum_{j=0}^{15} |org_{i,j} - MB_{mean}|$$

The re-adjustment of the motion vector may be performed using the following equation:

$$MV_{i,j} = \left( \frac{\sum_{k=0}^{3} \sum_{l=0}^{3} mv_{m,n,k,l}}{\sum_{k=0}^{3} \sum_{l=0}^{3} l} \right) >> 2, \quad i, j = 0, 1$$

where m and n denote coordinate values in the axis of abscissa and the axis of ordinate in an 8×8 mode block which is an intermediate macro block, and k and l denote coordinate values in the axis of abscissa and the axis of ordinate in a 4×4 mode block corresponding to the (m,n)-th macro block in 2×2 macro blocks.

BRIEF DESCRIPTION OF THE DRAWINGS

The above and other features and advantages of the present invention will become more apparent by describing in detail preferred embodiments thereof with reference to the attached drawings in which:

FIGS. 5A to 5D are graphs illustrating an image down-sampling method according to a preferred embodiment of the invention; and FIGS. 6A to 6D are diagrams illustrating a conversion method of macro block modes and motion vectors according to another preferred embodiment of the invention.

DETAILED DESCRIPTION OF THE EMBODIMENTS

Figure 1:
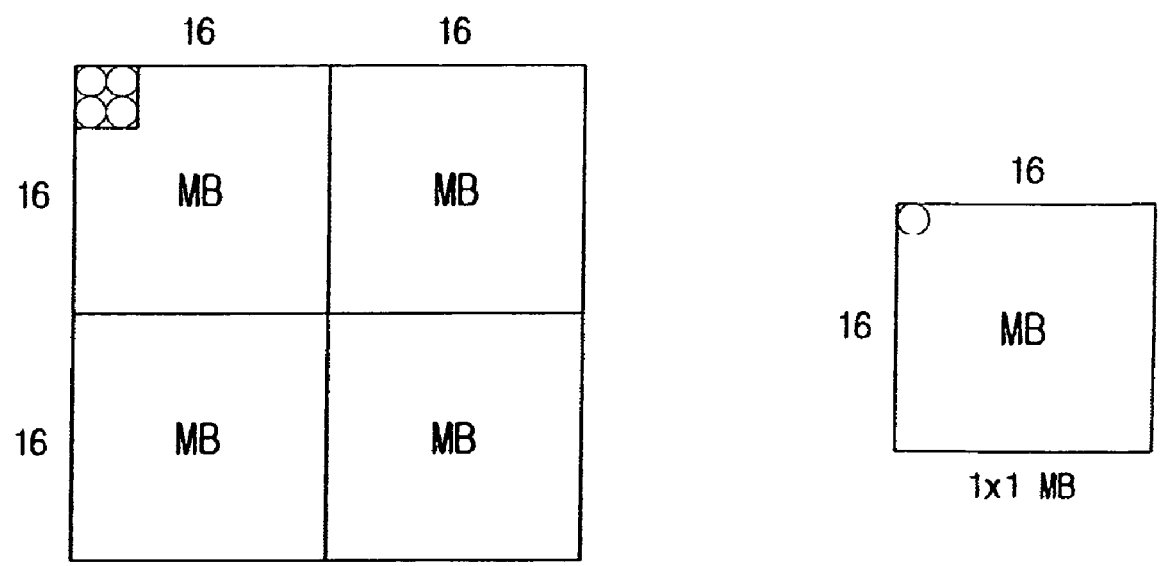
FIG. 1 is a diagram illustrating an image down-sampling method according to a preferred embodiment of the invention.
Figure 1:

Hereinafter, image down-sampling transcoding method and device according to exemplary embodiments of the present invention will be described in detail with reference to the attached drawings such that the invention can be easily put into practice by those skilled in the art. In the drawings, like elements are denoted by like reference numerals and thus repeated description thereof is omitted.

Generally, the simplest method for converting macro blocks (MB) in an H.264 frame into macro blocks in an MPEG-4 frame is a cascaded pixel-domain transcoding method of decompressing the compressed H.264 frame to be input and then compressing again the decompressed frame in accordance with MPEG-4. However, in such a method, since a motion estimation process of all the macro blocks in the whole frame is performed by an MPEG-4 encoder, real-time transmission by a transcoder can be hindered due to a large amount of calculation.

In the invention, block modes and motion vector data used in the H.264 decoder are re-used by the MPEG-4 encoder so as to perform the real-time transmission without performing the motion estimation process. According to an embodiment of the invention, a format, macro block data, and motion vector data of a current frame are extracted in the course of performing a variable length decoding (VLD) process of a bit stream compressed in accordance with H.264. Here, when the decompressed bit stream has a P (Predictive) frame format, the motion estimation process for which the MPEG-4 encoder requires much time can be omitted by reusing the block types and the motion vectors of the macro blocks.

As described above, a transcoding device according to the invention can include the H.264 decoder and the MPEG-4 encoder and the data extracted by the H.264 decoder can be supplied to the MPEG-4 encoder. The transcoding device according to the invention can be provided in a media gateway server and the like for transmitting bit streams to a reception unit.

Hereinafter, a transcoding method performed by the transcoding device according to the invention will be mainly described. Configurations and operations of the transcoding device according to the invention can be easily understood by those skilled in the art through the following description.

Now, a transcoding method employing conversion between block types in a pixel domain and adjustment of motion vectors at the time of conversion of H.264 BP (Baseline Profile) into MPEG-4 SP (Simple Profile) will be described with reference to FIG. 1 and FIGS. 2A to 2E. Then, the configuration of the transcoding device will be described with reference to FIG. 3 and a specific transcoding method will be then described with reference to FIG. 4. Results of a test of transcoding the H.264 BP into the MPEG-4 SP by the use of a pixel-domain transcoding method will be described with reference to FIGS. 5A to 5D. Finally, a method of rapidly performing a transcoding process using the conversion between block types and the adjustment of motion vectors through the use of a statistical technique will be described with reference to FIGS. 6A to 6D.

Procedure of Image Down-Sampling Transcoding

An image down-sampling method using an average filter as an image down-sampling method according to an exemplary embodiment of the invention is shown in FIG. 1.

For example, when a four-MB (Macro Block) type is converted into a one-MB type, a source image conventionally undergoes two image conversion processes in the course of converting an image having a CIF (Common Intermediate Format) size, which has passed through the H.264 (SP) encoder, into an image having a QCIF (Quarter Common Intermediate Format) size, thereby causing deterioration in image quality.

However, according to an embodiment of the invention, four 16×16 macro blocks in a CIF image decompressed by the H.264 decoder are down-sampled into one 16×6 macro block, which is a QCIF image, to be encoded by the MPEG-4 encoder. According to the invention, among a method of sampling one pixel value among four pixel values by the use of the average filter and a sub-sampling method of selecting only one pixel value among four pixel values, the method of down-sampling an image by the use of the average filter is used to down-sample the CIF image into the QCIF image. When an image is down-sampled using the sub-sampling method, it is slightly advantageous in view of temporal complexity, but deterioration in image quality occurs remarkably. Accordingly, the method of down-sampling by the use of the average filter is used. The invention uses the transcoding method in the pixel domain, instead of the transcoding method in the DCT domain having low complexity of calculation. Since an H.264 non-linear loop filter is used in the transcoding method in the DCT domain, a loop-filtered image should be subjected again to the DCT process and then the transcoding process in the DCT domain and a conversion relation between a 4×4 integer DCT and an 8×8 DCT should be derived. Accordingly, the amount of calculation increases.

H.264 uses ¼ pixel motion estimation motion and motion compensation, seven variable blocks (for example, inter 16×16, inter 16×8, inter 8×16, inter 8×8, inter 8×4, inter 4×8, and inter 4×4), and ten block modes (for example, skip, intra 16×16, intra 4×4, inter 16×16, inter 16×8, inter 8×16, inter 8×8, inter 8×4, inter 4×8, and inter 4×4). However, since MPEG-4 supports an intra 16×16 mode, an inter 16×16 mode, an inter 8×8 mode, and a skip mode, conversion between block types is performed to reuse such data in MPEG-4 in the invention.

A method of converting four macro block modes and motion vectors in H.264 into a macro block mode and motion vectors in MPEG-4 according to an exemplary embodiment of the invention is shown in FIGS. 2A to 2E.

Now, a transcoding method using the conversion between block types and the adjustment of motion vectors in the pixel domain at the time of conversion of H.264 BP into MPEG-4 SP will be described with reference to a variety of embodiments of converting 2×2 macro blocks of the decompressed H.264 bit stream into one macro block which can be reused in MPEG-4.

Figure 2A:
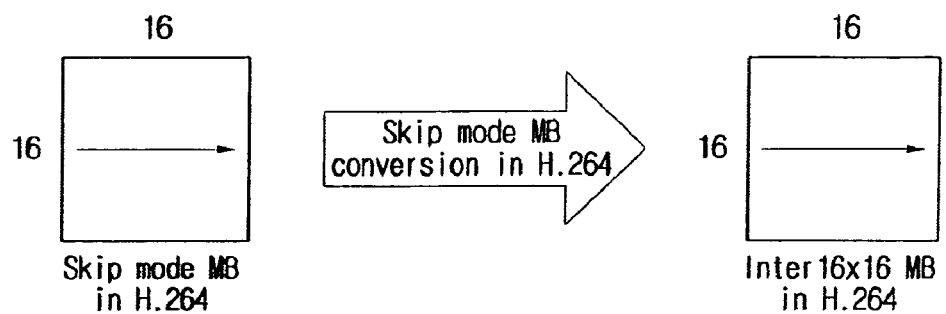
FIGS. 2A to 2D are diagrams illustrating a conversion method of macro block modes and motion vectors according to a preferred embodiment of the invention.

In FIG. 2A, the skip mode in H.264 indicates a pre-processing step for converting 2×2 macro blocks in H.264 into one macro block in MEPG-4 and serves to convert the macro blocks with the inter 16×16 mode in H.264.

Figure 2B:
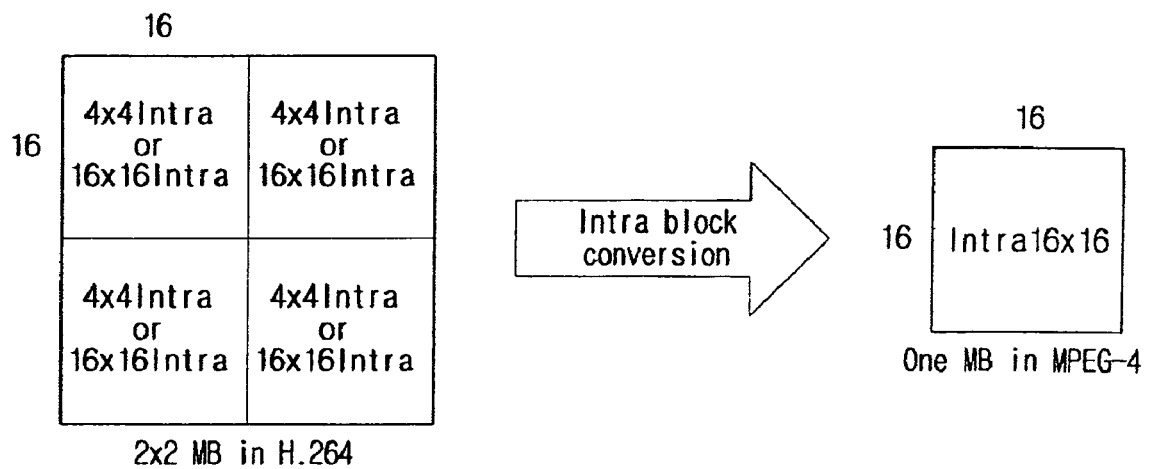

As in FIG. 2B, when the 2×2 macro blocks in H.264 includes only macro blocks having the intra 16×16 mode or the intra 4×4 mode, the 2×2 macro blocks is converted into one macro block having the intra 16×16 mode and an image is down-sampled by the use of the average filter.

Figure 2C:
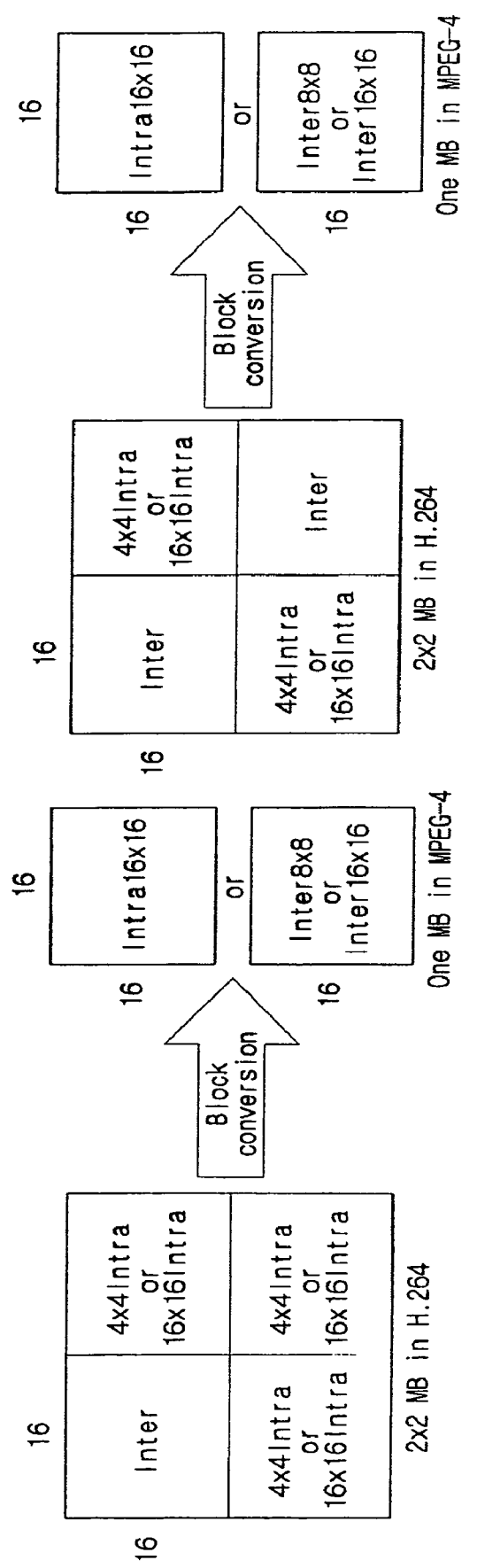

As in FIG. 2C, when two or three macro blocks among the 2×2 macro blocks in H.264 are intra mode macro blocks, it is not clear which mode among the inter 16×16 mode, the inter 8×8 mode, and the intra 16×16 mode the MPEG-4 encoder should use.

In this case, as in the related art, when the conversion is performed with any specific mode (the inter 16×16 mode, the inter 8×8 mode, or the intra 16×16 mode) in MPEG-4, the image quality deteriorates and the amount of encoded bits increases.

Accordingly, in the invention, a block mode having the least SAD (Sum of Absolute Difference) value is selected by comparing the SAD value of the macro block with the inter 16×16 mode with the sun of the SAD values of four macro blocks in the inter 8×8 mode in the MPEG-4 encoder. Subsequently, by comparing the SAD value of the selected inter mode with the SAD value of the intra mode calculated by Expression 1 and Expression 2 described below, the block mode having the least SAD value is finally selected.

$$MB_{mean} = \sum_{i=0}^{15}\sum_{j=0}^{15} org_{i,j} \quad \text{Expression 1}$$

$$SAD_{INTRA} = \sum_{i=0}^{15}\sum_{j=0}^{15} |org_{i,j} - MB_{mean}| \quad \text{Expression 2}$$

Here, $org_{i,j}$ denotes pixel values of 16×16 pixels in a macro block and $MB_{mean}$ denotes a mean value of the pixel values in the macro block. By performing the conversion with the optimal mode, the requirement for image quality and the requirement for the amount of encoded bits can both be satisfied.

Figure 2D:
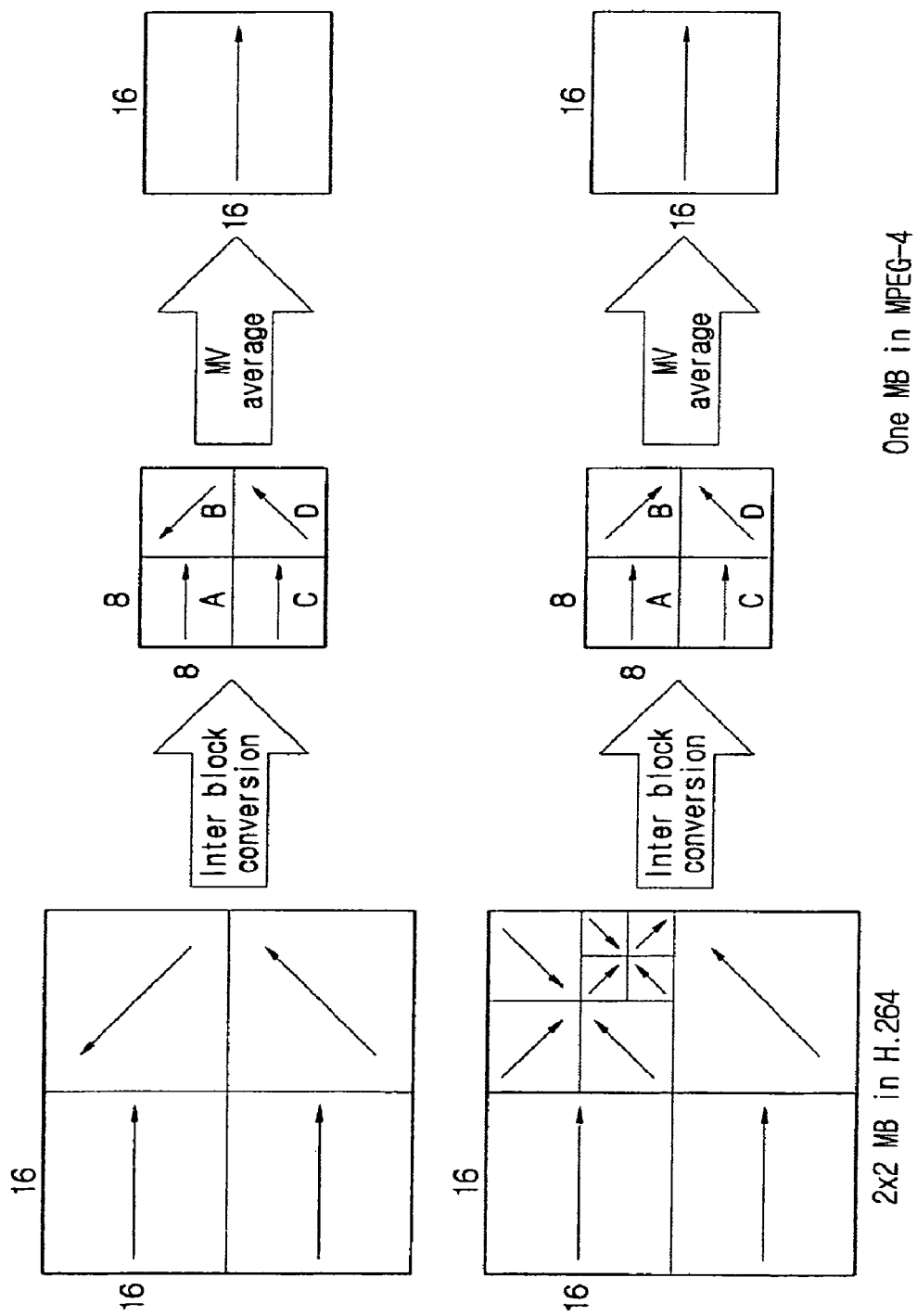

As in FIG. 2D, when the 2×2 macro blocks in H.264 include four or three macro blocks in the inter 16×16 mode, the MPEG-4 encoder performs the conversion with the inter 16×16 mode. Conventionally, when four or three macro blocks in the inter 16×16 mode are included in the 2×2 macro blocks in H.264, the MPEG-4 encoder can perform the conversion with the inter 16×16 mode or the inter 8×8. However, in the invention, the conversion is performed with the inter 16×16 mode, not the inter 8×8 mode. By first acquiring the averages of ¼ pixel motion vectors of the respective 2×2 macro blocks as integer pixel motion vectors of the four macro blocks in the 8×8 mode in MPEG-4 and then acquiring the average of the acquired integer pixel motion vectors as a motion vector of one macro block in the inter 16×16 mode, the mode conversion is performed. A specific equation for acquiring the integer pixel motion vectors is expressed as Expression 3 described below.

$$MV_{i,j} = \left( \frac{\sum_{k=0}^{3}\sum_{l=0}^{3} mv_{m,n,k,l}}{\sum_{k=0}^{3}\sum_{l=0}^{3} l} \right) \gg 2, \quad i, j = 0, 1 \qquad \text{Expression 3}$$

Here, m and n denote coordinate values in the axis of abscissa and the axis of ordinate in the 8×8 mode block which is an intermediate macro block and k and l denote coordinate values in the axis of abscissa and the axis of ordinate in the 8×8 mode block which is the (m,n)-th macro block in the 2×2 macro blocks.

The reason for performing the conversion with the inter 16×16 mode instead of the inter 8×8 mode is as follows. It is supposed that a quantization parameter is set to 10 with respect to a foreman image at the time of transcoding from H.264 to MPEG-4 and all the conditions are set to the same for all the conversions. Then, when the conversion is performed with the inter 8×8 mode under the condition shown in FIG. 2D, the PSNR is enhanced by 0.08 dB from 31.61 dB to 31.69 dB in comparison with the conversion with the inter 16×16 mode. However, since the amount of encoded bits increases from 143.2 kps to 156.8 kps, the whole encoding efficiency decreases.

Referring to FIG. 2E, when the 2×2 macro blocks has complex block modes, that is, one or more macro blocks in the inter 8×8 mode, one or less macro block in the intra mode, and macro blocks in other inter modes, the respective macro blocks of the 2×2 macro blocks are converted into the macro blocks in the inter 8×8 mode in MPEG-4. The integer pixel motion vectors of the macro blocks in the inter 8×8 mode in MPEG-4 are acquired by calculating the average of the ¼ pixel motion vectors of sixteen blocks in the 4×4 mode and dividing the average by 4. The calculating equation is equal to Expression 3.

Figure 3:
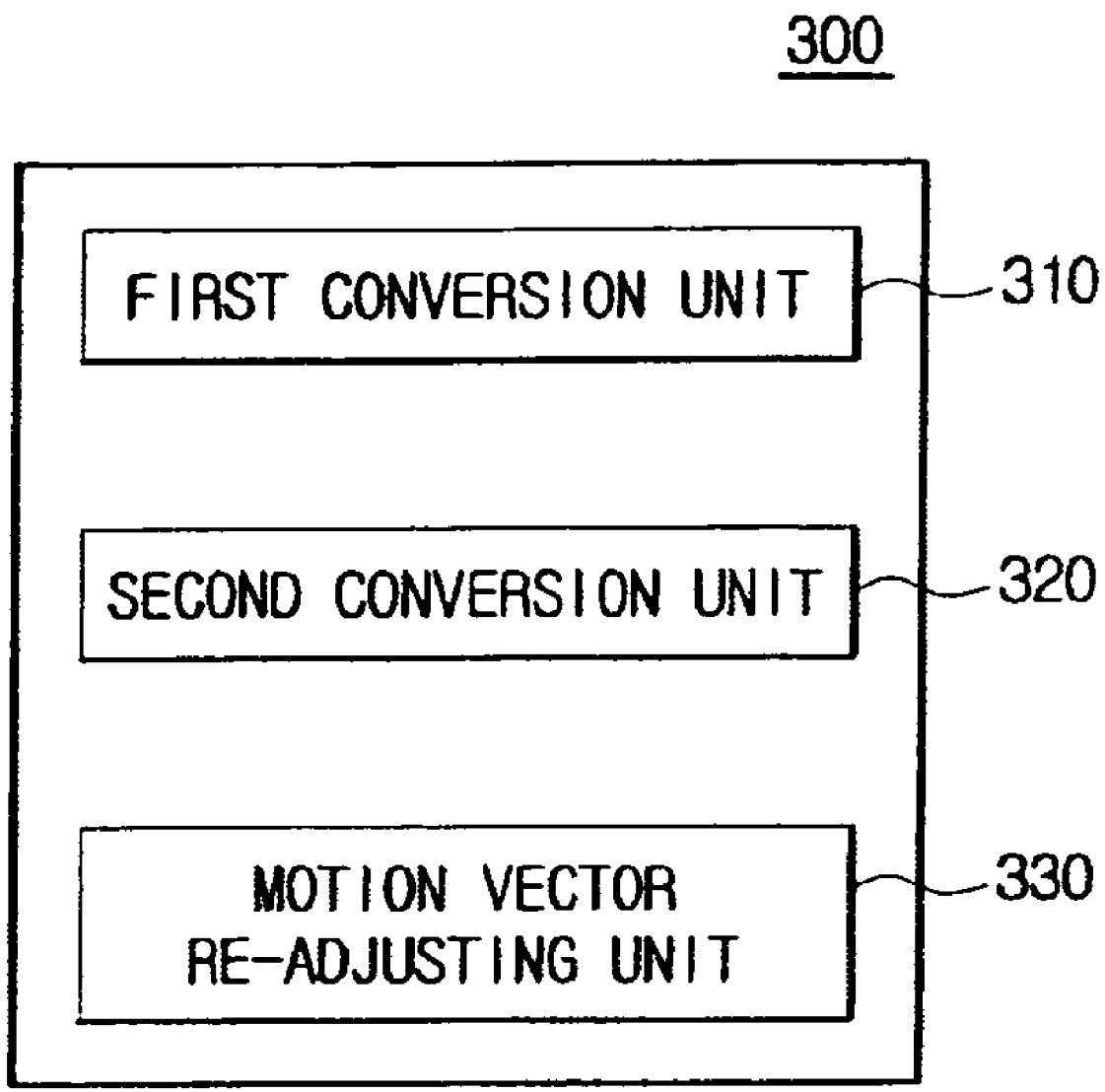
FIG. 3 is a block diagram illustrating a configuration of a transcoding device for down-sampling an image according to a preferred embodiment of the invention.

FIG. 3 is a block diagram illustrating a configuration of a transcoding device according to an exemplary embodiment of the invention.

Referring to FIG. 3, the transcoding device 300 according to the invention includes a first conversion unit 310, a second conversion unit 320, and a motion vector adjusting unit 330.

When the number of intra macro blocks included in a first macro block satisfies a first condition, the first conversion unit 310 determines a block mode of a second macro block and converts the first macro block into the second macro block with the determined block mode. For example, the first conversion unit 310 converts the intra macro blocks into one intra macro block (see FIG. 2B) when the first macro block includes only the intra macro blocks and determines the block mode by the use of the SAD comparison method of a macro block (see FIG. 2C) when the first macro block includes some intra macro blocks.

When the number of inter macro blocks included in the first macro block satisfies a second condition, the second conversion unit 320 determines the block mode of the second macro block and converts the first macro block into the second macro block with the determined block mode. For example, the second conversion unit 320 converts the first macro block into the second macro block with the inter mode when the number of inter macro blocks is greater than or equal to a predetermined number or when a difference value between the motion vectors is calculated and the difference value is less than or equal to a predetermined value, and determines the block mode by the use of the SAD comparison method of macro blocks and converts the first block into the second block with the determined block mode in the other cases. More specific functions will be described in detail with reference to FIG. 4.

The motion vector adjusting unit 330 re-adjusts the motion vectors of the second macro block.

Figure 4:
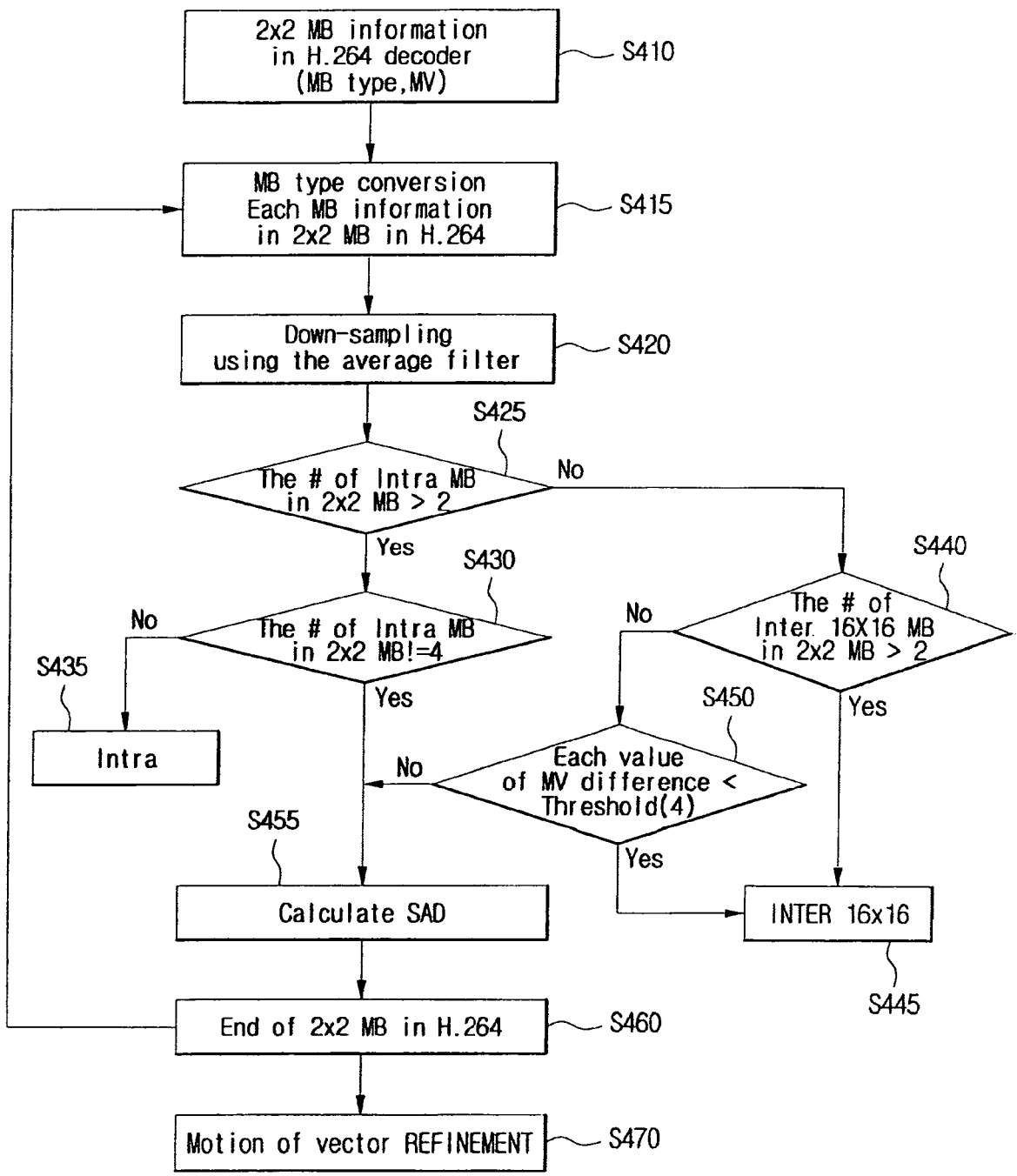
FIG. 4 is a flow diagram illustrating an image down-sampling method according to a preferred embodiment of the invention.

FIG. 4 is a flow diagram illustrating a procedure of performing the transcoding of 2×2 macro blocks from H.264 to MPEG-4.

As shown in FIG. 4, when the 2×2 macro blocks in H.264 are input (S410), the 2×2 MB type in H.264 is converted into a 1×1 MB type in accordance with the conditions (S415) and then the down-sampling is performed by the use of the average filter (S420).

Thereafter, a block mode in MPEG-4 is determined.

In S425, when the number of intra macro blocks included in the 2×2 macro blocks in H.264 is greater than 2, it is determined in S430 whether the number of macro blocks is 4. When the number of macro blocks is not 4, the conversion with an intra mode is performed in S435 and in the other case, S455 is performed.

On the other hand, when it is determined in S425 that the number of intra macro blocks included in the 2×2 macro blocks in H.264 is less than or equal to 2, S440 is performed. When it is determined in S440 that the number of macro blocks in the inter 16×16 mode included in the 2×2 macro blocks in H.264 is greater than 2 (for example, when the number is 4 or 3), the conversion with the inter 16×6 mode is performed in S445. On the contrary, when it is determined in S440 that the number of macro blocks in the inter 16×16 included in the 2×2 macro blocks in H.264 is less than or equal to 2, the difference values between all the integer pixel motion vectors are compared with a predetermined threshold value (for example, 4) in S450.

When the difference values are greater than or equal to the threshold value, the MB mode is determined by the use of the SAD process in S455. However, when the difference values are less than the threshold value, the conversion with the inter 16×16 mode is performed in S445.

Here, the reason for performing the conversion with the inter 16×16 mode instead of the inter 8×8 mode as the block mode to be used in the MPEG-4 encoder, like the inter 8×8 mode, the inter 8×4 mode, and the inter 4×4 mode in the H.264, is that the encoding and the image down-sampling in H.264 are a kind of low pass filtering (LPF).

Thereafter, the determination of the macro block mode is finished in S460 and then the conversion of a macro block is started in S415.

In this way, when the determination of the block mode is finished, the re-adjustment of a motion vector is performed in S470. That is, by searching for an integer pixel motion vector in ±3 neighboring pixels about a calculated integer pixel motion vector and searching for a half pixel motion vector in ±1 neighboring pixels about the searched integer pixel motion vector, the re-adjustment of a motion vector is performed, thereby obtaining enhancement in PSNR (Peak Signal-to-Noise Ratio).

FIGS. 5A to 5D are graphs illustrating results of a test of transcoding the H.264 BP to the MPEG-4 SP by the using the pixel-domain transcoding method according to an exemplary embodiment of the invention.

The test was performed using a transcoder including a JM (Joint Model) decoder reconstructed with the H.264 BP and a MoMuSys-FDIS-V1.0 encoder reconstructed with the MPEG-4 SP. The test was performed with a Pentium IV 2.8 GHz PC. H.264 bit streams generated by compressing Foreman, News, Paris, and Coast CIF (352×288) images was used in the JM encoder. In the respective images used for generation of the bit streams, an I (Intra) frame was used for only the first frame, a P (Predictive) frame was used for all the other frames, and 300 sequences were compressed for the test with a frame rate of 30 Hz.

Figure 5A:
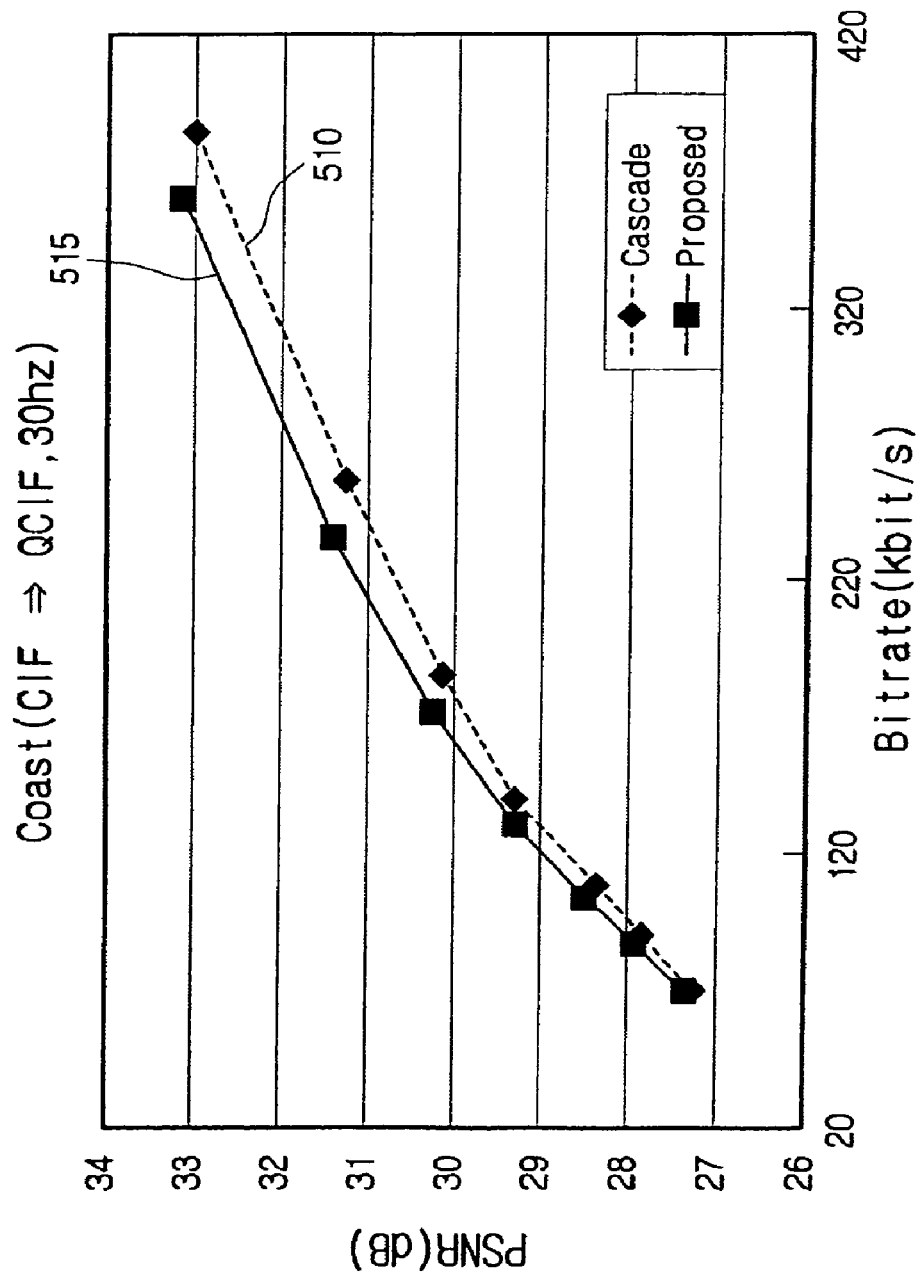
Figure 5B:
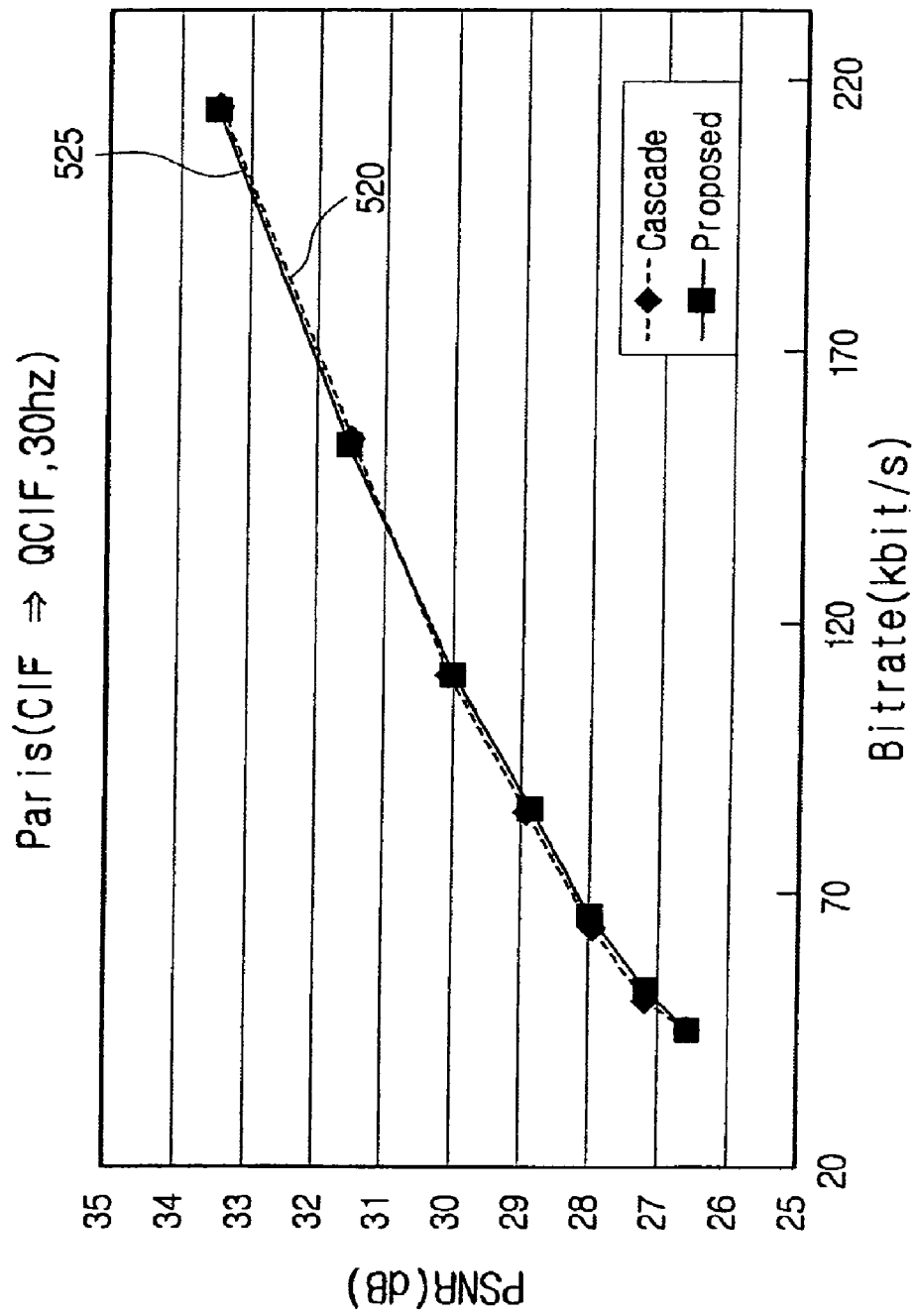

FIGS. 5A to 5B show PSNR differences in brightness values Y between the cascaded pixel-domain transcoding method according to the related art (510, 520, 530, and 540) and the image down-sampling transcoding method according to the invention (515, 525, 535, and 545) at the time of conversion of Coast, Paris, News, and Foreman image sequences from H.264 to MPEG-4. Here, all the motion images other than the Foreman image of FIG. 5D having the scene change do not exhibit deterioration in image quality and the enhancement in image quality by 0.5 dB in maximum is obtained in the Coast image of FIG. 5A.

Table 1 shows temporal gains in the transcoding method according to the invention. The speed-up effect of about 1.72 times is obtained averagely, slightly different depending upon the images. Considering only the MPEG-4 encoder, the speed-up effect of about 4.1 times is obtained.

Hitherto, the method of converting the H.264 BP into the MPEG-4 SP according to the invention has been described. In converting the block mode defined in H.264 into the block mode defined in MPEG-4, all the block modes defined in MPEG-4 are considered.

However, from the point of statistical view, only the least MPEG-4 block modes can be used by considering the features of the 2×2 macro blocks in H.264 in converting the 2×2 macro blocks in H.264 into a 1×1 macro block. Accordingly, it is possible to rapidly perform the transcoding without the deterioration of image quality.

Table 2 statistically shows conversion frequencies to the MPEG-4 block modes in consideration of the features of the 2×2 macro blocks in H.264. FIGS. 6A to 6D show a conversion process of macro blocks and motion vectors in consideration of the statistical method.

TABLE 2

Figure 5C:
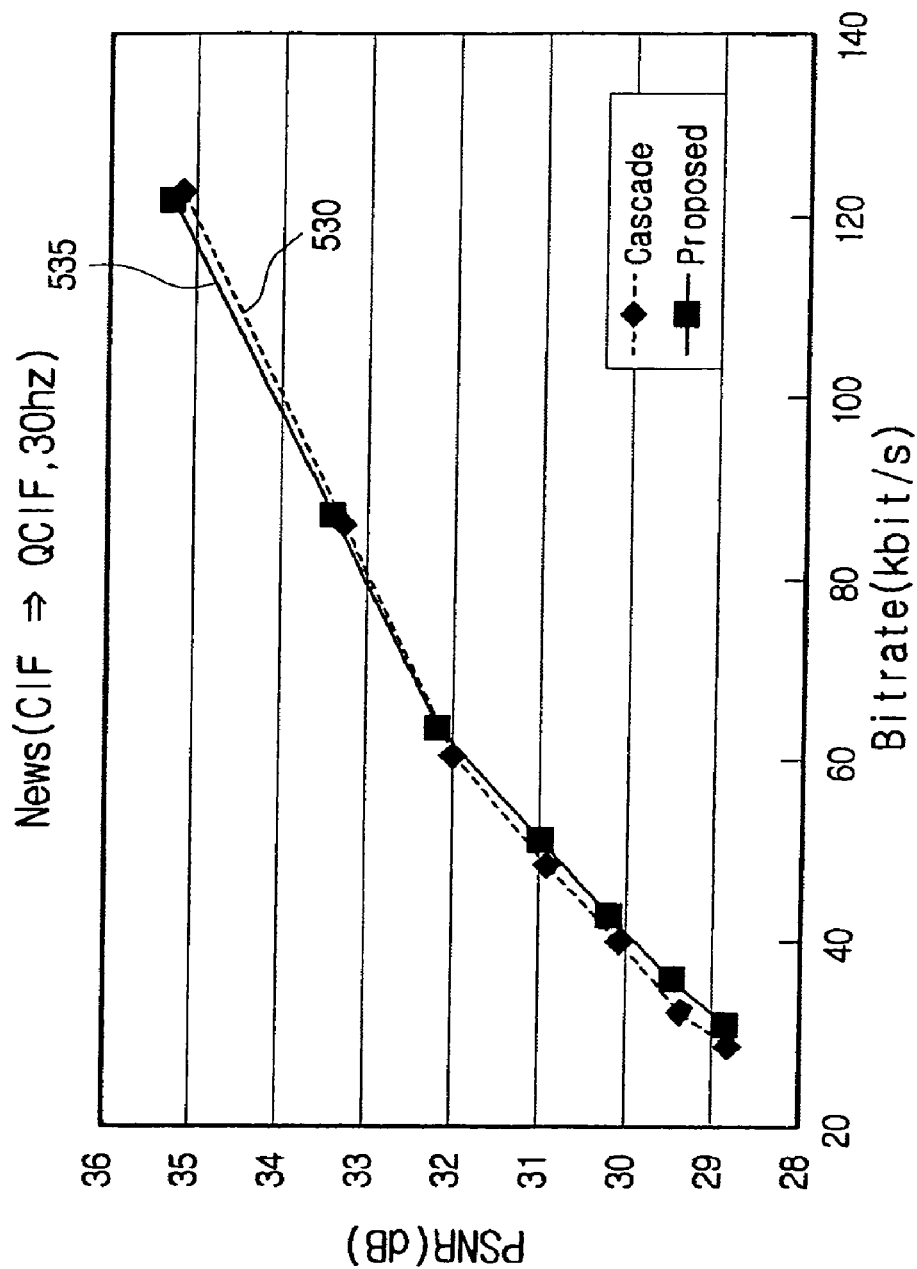
Figure 6B:
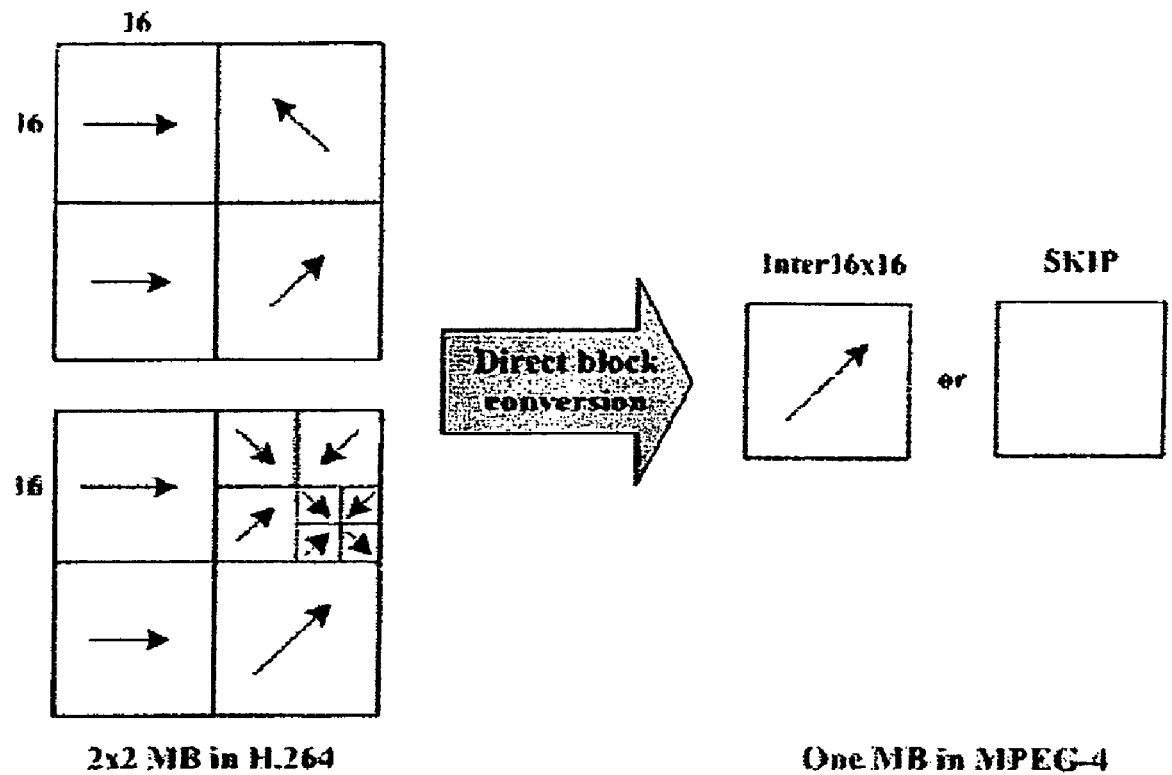
Figure 6C:
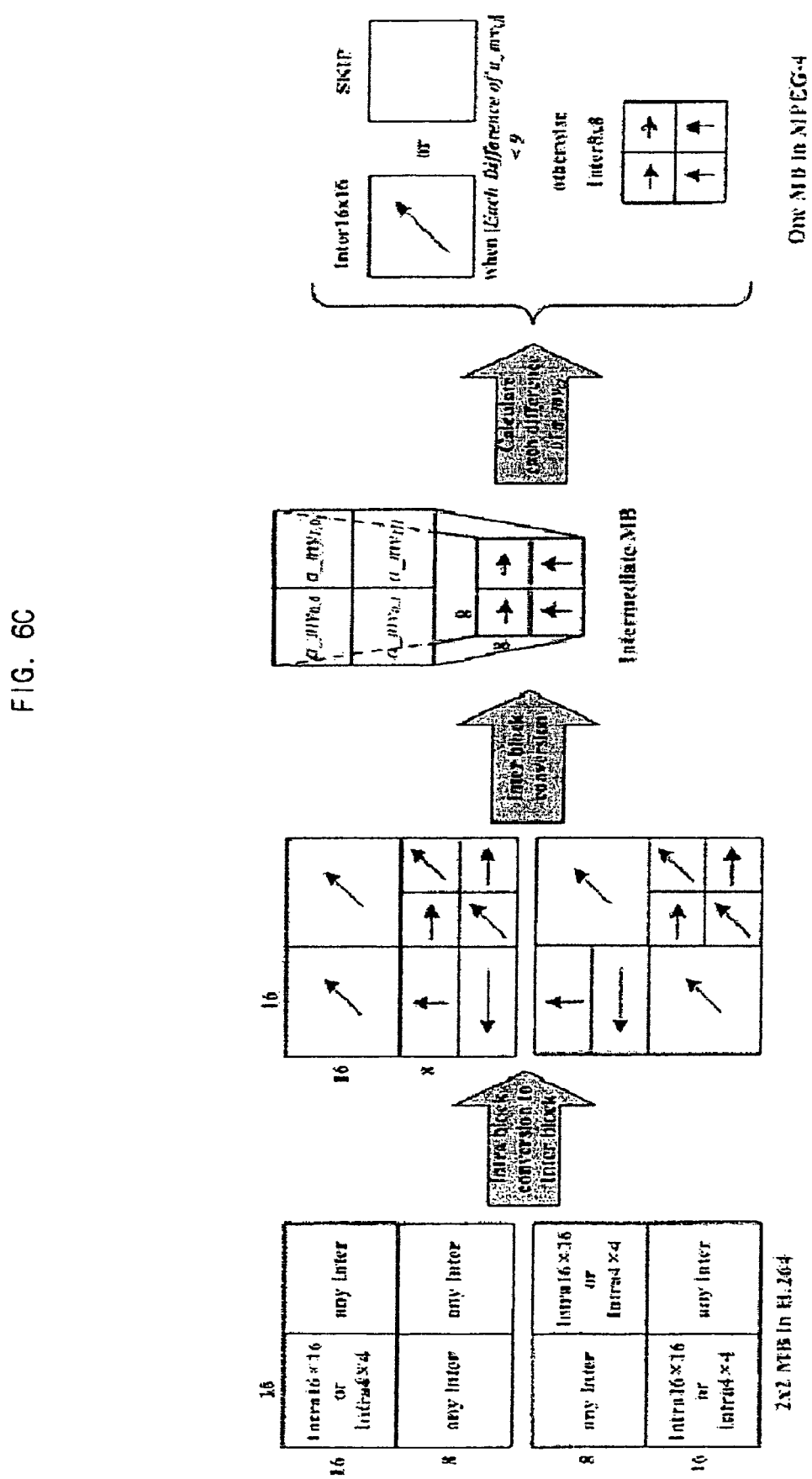
Figure 6D:
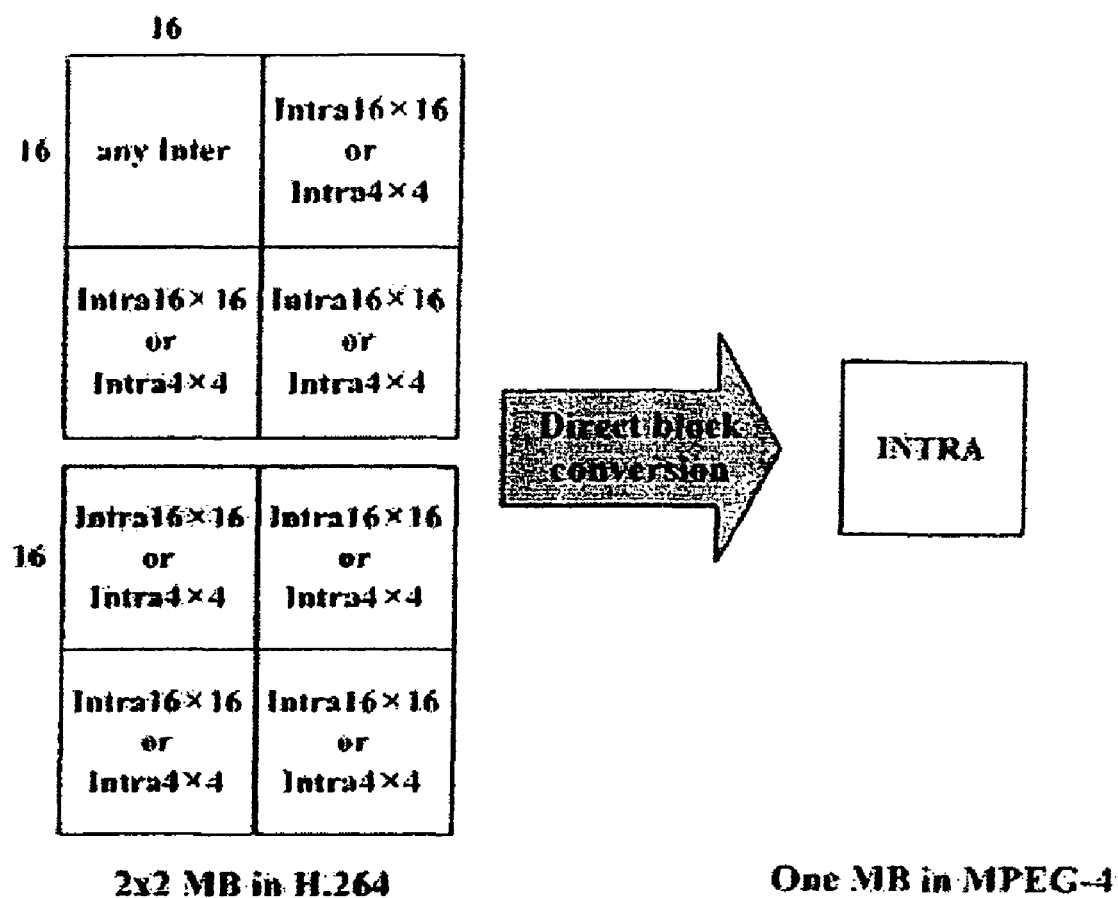

| MB modes of MPEG-4 2 × 2 MB modes of H.264 | INTRA | SKIP | INTER 16 × 16 | INTER 8 × 8 | Total | Others |
|---|---|---|---|---|---|---|
| two Inter 16 × 16, two blocks smaller than Inter 16 × 8 or Inter 8 × 16 | 0.20% | 13.53% | 3.48% | 1.88% | 19.09% | See FIG. 6A |
| one Inter 16 × 16, three blocks smaller than Inter 16 × 8 or Inter 8 × 16 | 0.22% | 13.91% | 2.16% | 3.21% | 19.49% | |
| four blocks smaller than Inter 16 × 8 or Inter 8 × 16 | 0.14% | 8.55% | 0.86% | 3.25% | 12.79% | |
| four Inter 16 × 16 | 0.26% | 3.48% | 25.94% | 0.09% | 29.77% | See FIG. 6B |
| three Inter 16 × 16, one block smaller than Inter16 × 8 or Inter 8 × 16 | 0.13% | 8.01% | 5.75% | 0.47% | 14.35% | |
| one Intra, three Inter FIG. 5C | 0.03% | 1.15% | 0.32% | 1.26% | 2.76% | See FIG. 6C |
| two Intra, two Inter FIG. 5C | 0.02% | 0.37% | 0.10% | 0.65% | 1.14% | |
| three Intra, one Inter FIG. 5D | 0.00% | 0.10% | 0.04% | 0.16% | 0.31% | See FIG. 6D |
| four Intra | 0.05% | 0.09% | 0.01% | 0.14% | 0.29% | |
| FIG. 5D Total Number | 1.04% | 49.19% | 38.65% | 11.11% | 100.00% | |

TABLE 1

| | Cascade Pixel-domain Transcoding | | | Proposed Transcoding | | |
|---|---|---|---|---|---|---|
| Sequence | H.264 decoder time | MPEG-4 encoder time | Transcoder Total time | H.264 decoder time | MPEG-4 encoder time | Transcoder Total time |
| News | 34.14 | 52.23 | 86.37 | 34.14 | 12.1 | 46.24 |
| Paris | 37.2 | 52.18 | 89.38 | 37.2 | 12.3 | 49.5 |
| Coast | 51.48 | 53.54 | 105.02 | 51.48 | 13.29 | 64.77 |
| Foreman | 49.54 | 53.49 | 103.03 | 49.54 | 13.32 | 62.86 |

As described above, the information conversion method for reusing block information defined in H.264 is provided. By reusing the previous motion vectors and the block information in H.264, enhancement in performance of about 1.8 times is obtained and the deterioration in image quality little occurs, in comparison with the conventional cascaded pixel-domain transcoding method requiring much time.

As can be seen from Table 2 and FIG. 6, in the transcoding method according to the invention, only the MPEG-4 block modes having a relatively high frequency at the time of converting the macro blocks having a predetermined size from H.264 to MPEG-4 can be considered. At this time, the features of the 2×2 macro blocks in H.264 can be used.

For example, when the 2×2 macro blocks in H.264 include two macro blocks in the inter 16×16 mode and the other two macro blocks have a smaller mode than the inter 16×8 mode or the inter 8×16 mode, only the inter 16×16 mode, the skip mode, or the inter 8×8 mode in MPEG-4 can be considered for the conversion as shown in FIG. 6A. It can be seen from Table 2 that the corresponding block modes have relatively high frequencies. As described above, it can be determined as follows whether one of the inter 16×16 mode and the skip mode in MPEG-4 should be selected or the inter 8×8 mode should be selected. That is, it can be primarily determined on the basis whether the difference values between the ¼ pixel motion vectors is less than a threshold value (for example, 9).

When the 2×2 macro blocks in H.264 include three or more intra macro blocks, the MPEG-4 block mode having the highest conversion frequency in Table 2 is the inter 8×8 block mode. However, since the very low value in frequency (that is, 0.14% or 0.16%) can be neglected, the intra block mode can be determined as the MPEG-4 block mode as shown in FIG. 6D.

According to the invention described above, it is possible to provide the image down-sampling transcoding method and device which can reduce the complexity while maintaining the image quality by re-using the information on the macro blocks.

In addition, the transcoder for converting a macro block from H.264 to MPEG-4 can permit the use of images compressed in accordance with H.264, which is a new standard for compressing a moving picture, without replacing devices employing an existing MPEG-4 codec.

Although the exemplary embodiments of the present invention have been described, the present invention is not limited to the embodiments, but it can be understood by those skilled in the art that the invention may be modified in various forms without departing from the spirit and scope of the appended claims.

What is claimed is:

1. An image down-sampling transcoding method for converting a first macro block having a first format into a second macro block having a second format, the image down-sampling transcoding method comprising:
   (a) determine a block mode of the second macro block having a C×D size (where C and D are natural numbers) and converting the first macro block into the second macro block with the determined block mode, when the number of intra macro blocks included in the first macro block having a A×B size (where A and B are natural numbers) satisfies a first condition;
   (b) determining a block mode of the second macro block and converting the first macro block into the second macro block with the determined block mode, when the number for inter macro blocks included in the first macro block satisfies a second condition; and
   (c) re-adjusting a motion vector of the second macro block, after the conversion of the first macro block into the second macro block is finished,
   wherein the block mode in step (a) is determined, at least in part, by the use of an SAD comparison method for macro blocks, when the first macro block includes some intra blocks.

2. The image down-sampling transcoding method according to claim 1, wherein the first macro block is converted into the second macro block with the determined block mode while being down-sampled by the use of an average filter.

3. The image down-sampling transcoding method according to claim 1, wherein step (a) includes converting the first macro block into one intra macro block, when the first macro block includes only the intra macro blocks.

4. The image down-sampling transcoding method according to claim 1, wherein step (b) includes:
   converting the first macro block into the second macro block with the inter mode when the number of inter macro blocks is greater than or equal to a predetermined number or when a difference value between the motion vectors is calculated and the difference value is less than or equal to a predetermined value; and
   determining the block mode by the use of an SAD comparison method of macro blocks and converting the first block into the second block with the determined block mode in the other cases.

5. The image down-sampling transcoding method according to claim 4, wherein the SAD comparison method includes:
   calculating SADs between two inter macro blocks and determining the least inter SAD; and
   converting the first macro block into the second macro block with the block mode corresponding to the least SAD by comparing the least inter SAD with the predetermined intra SAD.

6. The image down-sampling transcoding method according to claim 5, wherein a mean pixel value of a macro block is calculated by the following expression:

$$MB_{mean} = \sum_{i=0}^{15}\sum_{j=0}^{15} org_{i,j}$$

where $org_{ij}$ denotes pixel values of 16×16 pixels in a macro block and $MB_{mean}$ denotes the mean pixel value of a macro block, and
   wherein the intra SAD is calculated by the following expression:

$$SAD_{INTRA} = \sum_{i=0}^{15}\sum_{j=0}^{15} |org_{i,j} - MB_{mean}|.$$

7. The image down-sampling transcoding method according to claim 1, wherein the SAD comparison method includes:
   calculating SADs between two inter macro blocks and determining the least inter SAD; and
   converting the first macro block into the second macro block with the block mode corresponding to the least SAD by comparing the least inter SAD with the predetermined intra SAD.

8. The image down-sampling transcoding method according to claim 7, wherein a mean pixel value of a macro block is calculated by the following expression:

$$MB_{mean} = \sum_{i=0}^{15}\sum_{j=0}^{15} org_{i,j}$$

where $org_{ij}$ denotes pixel values of 16×16 pixels in a macro block and $MB_{mean}$ denotes the mean pixel value of a macro block, and
   wherein the intra SAD is calculated by the following expression:

$$SAD_{INTRA} = \sum_{i=0}^{15}\sum_{j=0}^{15} |org_{i,j} - MB_{mean}|.$$

9. The image down-sampling transcoding method according to claim 1, wherein the re-adjustment of the motion vector is performed by the use of the following expression:

$$MV_{i,j} = \left( \frac{\sum_{k=0}^{3}\sum_{l=0}^{3} mv_{m,n,k,l}}{\sum_{k=0}^{3}\sum_{l=0}^{3} l} \right) \gg 2, \quad i, j = 0, 1$$

where m and n denote coordinate values in the axis of abscissa and the axis of ordinate in an 8×8 mode block which is an intermediate macro block and k and l denote coordinate values in the axis of abscissa and the axis of ordinate in a 4×4 mode block corresponding to the (m,n)-th macro block in 2×2 macro blocks.

10. The image down-sampling transcoding method according to claim 1, wherein step (c) includes:
   searching for an integer pixel motion vector in ±3 neighboring pixels about an integer pixel motion vector; and
   searching for a half pixel motion vector in ±1 neighboring pixels about the searched integer pixel motion vector.

11. An image down-sampling transcoding method for converting a first macro block having a first format into a second macro block having a second format, the image down-sampling transcoding method comprising:
   determining any one of candidate block modes having the second format, which is determined in accordance with a predetermined condition by types of macro blocks included in the first macro block having a predetermined size, as a block mode of the second macro block and converting the first macro block into the second macro block with the determined block mode; and
   re-adjusting a motion vector of the second macro block, after the conversion of the first macro block into the second macro block is finished,
   wherein the predetermined condition comprises that any one of the candidate block modes is determined as the block mode by the use of a SAD comparison method of macro blocks included in the first macro block, when two or less intra macro blocks are included in the first macro block.

12. The image down-sampling transcoding method according to claim 11, wherein the predetermined condition is that one intra macro block having the second format is determined as the block mode when three or more intra macro blocks are included in the first macro block.

13. The image down-sampling transcoding method according to claim 11,
   wherein the candidate block modes include one or more of a skip mode, an inter 16×16 mode, and an inter 8×8 mode.

14. The image down-sampling transcoding method according to claim 13, wherein when a difference between the motion vectors in the respective macro blocks is calculated and the difference is less than or equal to a predetermined threshold value, any one of the inter 16×16 mode and the skip mode is determined as the block mode and in the other cases, the inter 8×8 mode is determined as the block mode.

15. The image down-sampling transcoding method according to claim 13, wherein any one of the candidate block modes is a block mode having the least SAD value.

16. The image down-sampling transcoding method according to claim 13, wherein a mean pixel value of a macro block is calculated by the following expression:

$$MB_{mean} = \sum_{i=0}^{15} \sum_{j=0}^{15} org_{i,j}$$

where $org_{ij}$ denotes pixel values of 16×16 pixels in a macro block and $MB_{mean}$ denotes the mean pixel value of a macro block, and
   wherein the intra SAD is calculated by the following expression:

$$SAD_{INTRA} = \sum_{i=0}^{15} \sum_{j=0}^{15} org_{i,j} - MB_{mean}.$$

17. The image down-sampling transcoding method according to claim 11, wherein the predetermined condition comprises that any one of the candidate block modes is determined as the block mode by the use of a SAD comparison method of macro blocks, when only inter macro blocks are included in the first macro block and two or less macro blocks in the inter 16×16 mode are included in the inter macro blocks, and
   wherein the candidate block modes include one or more of a skip mode, an inter 16×16 mode, and an inter 8×8 mode.

18. The image down-sampling transcoding method according to claim 17, wherein when a difference between the motion vectors in the respective macro blocks is calculated and the difference is less than or equal to a predetermined threshold value, any one of the inter 16×16 mode and the skip mode is determined as the block mode and in the other cases, the inter 8×8 mode is determined as the block mode.

19. The image down-sampling transcoding method according to claim 17, wherein any one of the candidate block modes is a block mode having the least SAD value.

20. The image down-sampling transcoding method according to claim 11, wherein the re-adjustment of the motion vector is performed, by the use of the following expression:

$$MV_{i,j} = \left( \frac{\sum_{k=0}^{3} \sum_{l=0}^{3} mv_{m,n,k,l}}{\sum_{k=0}^{3} \sum_{l=0}^{3} l} \right) \gg 2, \quad i, j = 0, 1$$

where m and n denote coordinate values in the axis of abscissa and the axis of ordinate in an 8×8 mode block which is an intermediate macro block and k and l denote coordinate values in the axis of abscissa and the axis of ordinate in a 4×4 mode block corresponding to the (m,n)-th macro block in 2×2 macro blocks.

21. An image down-sampling transcoding device for converting a first macro block having a first format into a second macro block having a second format, the image down-sampling transcoding device comprising:
   a first conversion unit determining a block mode of the second macro block and converting the first macro block into the second macro block with the determined block mode, when the number of intra macro blocks included in the first macro block satisfies a first condition;
   a second conversion unit determining a block mode of the second macro block and converting the first macro block into the second macro block with the determined block mode, when the number for inter macro blocks included in the first macro block satisfies a second condition; and
   a motion vector re-adjusting unit re-adjusting a motion vector of the second macro block, after the conversion of the first macro block into the second macro block is finished,
   wherein the first conversion unit determines the block mode, at least in part, by the use of an SAD comparison method for macro blocks, when the first macro block includes some intra macro blocks.

22. The image down-sampling transcoding device according to claim 21, wherein the first conversion unit:
   converts the first macro block into one intra macro block, when the first macro block includes only the intra macro blocks.

23. The image down-sampling transcoding device according to claim 21, wherein the second conversion unit:
   converts the first macro block into the second macro block with the inter mode, when the number of inter macro blocks is greater than or equal to a predetermined number or when a difference value between the motion vectors is calculated and the difference value is less than or equal to a predetermined value; and determines the block mode by the use of an SAD comparison method of macro blocks and converts the first block into the second block with the determined block mode in the other cases.

24. The image down-sampling transcoding device according to claim 23, wherein the SAD comparison method includes: calculating SADs between two inter macro blocks and determining the least inter SAD; and converting the first macro block into the second macro block with the block mode corresponding to the least SAD by comparing the least inter SAD with the predetermined intra SAD.

25. An image down-sampling transcoding device for converting a first macro block having a first format into a second macro block having a second format, the image down-sampling transcoding device comprising:
a conversion unit determining anyone of candidate block modes having the second format, which is determined in accordance with a predetermined condition by types of macro blocks included in the first macro block having a predetermined size, as a block mode of the second macro block and converting the first macro block into the second macro block with the determined block mode; and
a motion vector re-adjusting unit re-adjusting a motion vector of the second macro block, after the conversion of the first macro block into the second macro block is finished,
wherein the predetermined condition comprises that any one of the candidate block modes is determined as the block mode by the use of a SAD comparison method of macro blocks included in the first macro block, when two or less intra macro blocks are included in the first macro block.

26. The image down-sampling transcoding device according to claim 25, wherein the predetermined condition comprises that one intra macro block having the second format is determined as the block mode when three or more intra macro blocks are included in the first macro block.

27. The image down-sampling transcoding device according to claim 25,
wherein the candidate block modes include one or more of a skip mode, an inter 16×16 mode, and an inter 8×8 mode.

28. The image down-sampling transcoding device according to claim 27, wherein the conversion unit calculates a difference, between the motion vectors in the respective macro blocks, determines any one of the inter 16×16 mode and the skip mode as the block mode when the difference is less than or equal to a predetermined threshold value, and in the other cases, determines the inter 8×8 mode as the block mode.

29. The image down-sampling transcoding device according to claim 27, wherein a mean pixel value of a macro block is calculated by the following expression:

$$MB_{mean} = \sum_{i=0}^{15} \sum_{j=0}^{15} org_{i,j}$$

where $org_{ij}$ denotes pixel values of 16×16 pixels in a macro block and $MB_{mean}$ denotes the mean pixel value of a macro block, and
wherein the intra SAD is calculated by the following expression:

$$SAD_{INTRA} = \sum_{i=0}^{15} \sum_{j=0}^{15} org_{i,j} - MB_{mean}.$$

30. The image down-sampling transcoding device according to claim 25, wherein the predetermined condition comprises that any one of the candidate block modes is determined as the block mode by the use of a SAD comparison method of macro blocks, when only inter macro blocks are included in the first macro block and two or less macro blocks in the inter 16×16 mode are included in the inter macro blocks, and
wherein the candidate block modes include one or more of a skip mode, an inter 16×16 mode, and an inter 8×8 mode.

31. The image down-sampling transcoding device according to claim 30, wherein the conversion unit calculates a difference between the motion vectors in the respective macro blocks, determines any one of the inter 16×16 mode and the skip mode as the block mode when the difference is less than or equal to a predetermined threshold value, and in the other cases, determines the inter 8×8 mode as the block mode.

32. The image down-sampling transcoding device according to claim 25, wherein the re-adjustment of the motion vector is performed by the use of the following expression:

$$MV_{i,j} = \left( \frac{\sum_{k=0}^{3} \sum_{l=0}^{3} mv_{m,n,k,l}}{\sum_{k=0}^{3} \sum_{l=0}^{3} l} \right) \gg 2, \quad i, j = 0, 1$$

where m and n denote coordinate values in the axis of abscissa and the axis of ordinate in an 8×8 mode block which is an intermediate macro block and k and l denote coordinate values in the axis of abscissa and the axis of ordinate in a 4×4 mode block corresponding to the (m,n)-th macro block in 2×2 macro blocks.

* * * * *